United States Patent
Kwon (10) Patent No.: US 11,688,893 B2
(45) Date of Patent: Jun. 27, 2023

(54) BATTERY DEVICE AND BATTERY TEMPERATURE ADJUSTING METHOD

(71) Applicant: LG CHEM, LTD., Seoul (KR)

(72) Inventor: Dong Keun Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 438 days.

(21) Appl. No.: 16/629,446

(22) PCT Filed: Nov. 16, 2018

(86) PCT No.: PCT/KR2018/014154
§ 371 (c)(1),
(2) Date: Jan. 8, 2020

(87) PCT Pub. No.: WO2019/103412
PCT Pub. Date: May 31, 2019

(65) Prior Publication Data
US 2020/0212512 A1 Jul. 2, 2020

(30) Foreign Application Priority Data

Nov. 24, 2017 (KR) ........................ 10-2017-0158761

(51) Int. Cl.
*H01M 10/44* (2006.01)
*H01M 10/615* (2014.01)
(Continued)

(52) U.S. Cl.
CPC ....... *H01M 10/443* (2013.01); *H01M 10/441* (2013.01); *H01M 10/482* (2013.01);
(Continued)

(58) Field of Classification Search
CPC ............. H01M 10/443; H01M 10/441; H01M 10/482; H01M 10/615; H01M 10/635;
(Continued)

(56) References Cited

U.S. PATENT DOCUMENTS

| 5,617,009 A | 4/1997 | Takao et al. |
| 2003/0067722 A1* | 4/2003 | Vitek ..................... H05K 7/207 |
| | | 361/78 |

(Continued)

FOREIGN PATENT DOCUMENTS

| JP | H5-62718 A | 3/1993 |
| JP | H7-7866 A | 1/1995 |

(Continued)

OTHER PUBLICATIONS

Office Action dated Sep. 6, 2021, issued in corresponding Japanese Patent Application No. 2020-514487.

(Continued)

*Primary Examiner* — Daniel Kessie
*Assistant Examiner* — Brian K Baxter
(74) *Attorney, Agent, or Firm* — Morgan, Lewis & Bockius LLP (57) ABSTRACT

The present invention includes providing a plurality of batteries connected to a power generation line connected to an external generator, measuring the temperature of a space in which the plurality of batteries are positioned, and controlling charging and discharging between the plurality of batteries according to the measured temperature so as to raise the temperature of the plurality of batteries, and the present invention can prevent a reduction in the temperature of the battery.

16 Claims, 4 Drawing Sheets

(51) Int. Cl.
  *H01M 10/635* (2014.01)
  *H01M 10/637* (2014.01)
  *H01M 10/6563* (2014.01)
  *H01M 10/48* (2006.01)
  *H02J 7/00* (2006.01)

(52) U.S. Cl.
  CPC ....... *H01M 10/486* (2013.01); *H01M 10/615* (2015.04); *H01M 10/635* (2015.04); *H01M 10/637* (2015.04); *H01M 10/6563* (2015.04); *H02J 7/007* (2013.01); *H02J 7/0013* (2013.01)

(58) Field of Classification Search
  CPC ............. H01M 10/637; H01M 10/6563; H02J 7/0013; H02J 7/007
  See application file for complete search history.

(56) References Cited

U.S. PATENT DOCUMENTS

| | | | |
|---|---|---|---|
| 2006/0036883 A1* | 2/2006 | Hashizumi | H01M 10/615 713/300 |
| 2007/0210769 A1* | 9/2007 | Tsutsumi | H01M 10/425 323/269 |
| 2007/0212598 A1* | 9/2007 | Iida | B60L 58/25 429/62 |
| 2008/0280192 A1* | 11/2008 | Drozdz | H01M 10/6566 700/297 |
| 2009/0253029 A1* | 10/2009 | Inoue | H01M 10/617 429/71 |
| 2010/0075206 A1* | 3/2010 | Tamura | H01M 50/20 429/62 |
| 2010/0092813 A1* | 4/2010 | Sahu | H01M 8/0432 429/409 |
| 2010/0268493 A1* | 10/2010 | Tae | H01M 10/482 702/63 |
| 2010/0270976 A1 | 10/2010 | Tamura | |
| 2011/0018491 A1* | 1/2011 | Yoshida | B60L 58/27 320/101 |
| 2011/0050204 A1* | 3/2011 | Park | H01M 10/482 324/76.11 |
| 2013/0020302 A1* | 1/2013 | Chiu | H05B 3/50 219/201 |
| 2013/0078495 A1* | 3/2013 | Chiu | H01M 10/613 429/120 |
| 2014/0197778 A1 | 7/2014 | Kim | |
| 2014/0328659 A1* | 11/2014 | Marji | H01M 50/24 429/62 |
| 2015/0008887 A1 | 1/2015 | Kim et al. | |
| 2015/0010782 A1* | 1/2015 | Tanigaki | B60L 50/64 429/7 |
| 2015/0191072 A1* | 7/2015 | Inoue | B60H 1/00885 62/428 |
| 2015/0270587 A1* | 9/2015 | Cho | H01M 10/6563 429/62 |
| 2015/0357614 A1 | 12/2015 | Sohn et al. | |
| 2015/0380785 A1* | 12/2015 | Takeuchi | B60L 1/02 429/62 |
| 2016/0023532 A1* | 1/2016 | Gauthier | H01M 10/6568 62/502 |
| 2016/0111762 A1* | 4/2016 | Kawakami | H01M 50/20 429/83 |
| 2016/0156081 A1* | 6/2016 | Wang | H01M 10/613 429/50 |
| 2016/0233563 A1* | 8/2016 | Oshima | H01M 50/20 |
| 2017/0200991 A1 | 7/2017 | Nam et al. | |
| 2017/0256833 A1* | 9/2017 | Ciaccio | H01M 10/6556 |
| 2017/0305285 A1* | 10/2017 | Tokito | H01M 10/425 |
| 2017/0338519 A1* | 11/2017 | Junger | H01M 10/4207 |
| 2019/0115632 A1* | 4/2019 | Beuning | H01M 10/657 |
| 2019/0140234 A1* | 5/2019 | Marpu | H01M 10/625 |
| 2021/0175485 A1* | 6/2021 | Sieber | H01M 10/657 |

FOREIGN PATENT DOCUMENTS

| | | |
|---|---|---|
| JP | 2001-251780 A | 9/2001 |
| JP | 2010-044895 A | 2/2010 |
| JP | 2012-252907 A | 12/2012 |
| JP | 2013-005678 A | 1/2013 |
| JP | 2013-046559 A | 3/2013 |
| JP | 2015-159115 A | 9/2015 |
| JP | 6036236 B2 | 11/2016 |
| JP | 2017-85866 A | 5/2017 |
| KR | 10-2014-0072965 A | 6/2014 |
| KR | 10-2014-0092978 A | 7/2014 |
| KR | 2014-0133472 A | 11/2014 |
| KR | 10-2015-0030501 A | 3/2015 |
| KR | 10-1579569 B1 | 12/2015 |
| KR | 10-2016-0060967 A | 5/2016 |
| KR | 10-2016-0112073 A | 9/2016 |
| KR | 10-2016-0125829 A | 11/2016 |
| KR | 10-1682457 B1 | 12/2016 |

OTHER PUBLICATIONS

First Notification Office Action dated Jan. 1, 2021, issued in corresponding Japanese Patent Application No. 2020-514487.
International Search Report dated Feb. 25, 2019, issued in corresponding International Patent Application No. PCT/KR2018/014154.
Extended European Search Report dated Jul. 21, 2020, issued in corresponding European Patent Application No. 18881490.9.

\* cited by examiner

BATTERY DEVICE AND BATTERY TEMPERATURE ADJUSTING METHOD

TECHNICAL FIELD

The present disclosure relates to a battery device and a method for controlling the temperature of a battery, and more particularly, to a battery device capable of preventing a reduction in the temperature of a battery and a method for controlling the temperature of a battery.

BACKGROUND ART

In recent years, as demand for portable electronic products such as laptops, video cameras, and mobile phones has been rapidly increased and the development of electric vehicles, energy storage batteries, robots, satellites, and the like is accelerated, research on a high-performance battery device capable of repeated charging and discharging have been actively conducted. In addition, as carbon energy has recently been depleted and interest in the environment has increased, interest and research has been focused on a battery device that can efficiently utilize stored power.

As a battery included in the battery device, a nickel cadmium battery, a nickel hydrogen battery, a nickel zinc battery, or a lithium ion battery may be used. Among these batteries, the lithium ion battery is drawing attention because the lithium ion battery is free to charge or discharge, has a very low self-discharge rate, and has a high energy density.

However, the lithium ion battery is greatly affected by ambient temperature environment conditions because the charging or discharging process is performed by an electrochemical reaction. When the lithium ion battery is exposed to a high-temperature environment for a long time, the charging and discharging efficiency is reduced and the lifetime can be shortened. In addition, when the temperature of the lithium ion battery rises excessively, electrolyte decomposition, a thermal runaway phenomenon, and the like due to heat generation may occur. Thus, a cooler such as an air conditioner is operated to prevent the lithium ion battery from being exposed to a high-temperature environment.

In contrast, when the lithium ion battery is exposed to a low-temperature environment, the amount of the discharged current decreases, and thus the capacity of the lithium ion battery may be deteriorated. However, research on a technique for raising the temperature of the lithium ion battery is unsatisfactory as compared with that of lowering the temperature of the lithium ion battery.

RELATED ART DOCUMENT

Korean Patent Publication No. 2016-0125829

DISCLOSURE OF THE INVENTION

Technical Problem

The present disclosure provides a battery device and a method for controlling the temperature of a battery which may easily raise the temperature of a battery.

The present disclosure provides a battery device and a method for controlling the temperature of a battery which may improve efficiency of energy used for controlling the temperature of the battery.

Technical Solution

In accordance with an exemplary embodiment, a battery device includes: a plurality of batteries connected to a power generation line connected to an external generator; and a controller controlling charging and discharging between the plurality of batteries according to the temperature of a space in which the plurality of batteries are positioned, so as to raise the temperature of the plurality of batteries, wherein the plurality of batteries are connected in parallel, and final terminals of the plurality of batteries connected in parallel are connected to the power generation line.

The battery device may further include a hot-air blower connected to the plurality of batteries and installed to supply hot air to the space in which the plurality of batteries are positioned, wherein the controller may control discharging of the plurality of batteries so as to supply, to the hot-air blower, at least a portion of current discharged from the plurality of batteries.

The battery device may further include: a first switch installed on the power generation line and the plurality of batteries; and a second switch installed between the hot-air blower and the plurality of batteries.

The battery device may further include a plurality of auxiliary switches installed between the plurality of batteries so as to control a flow of the current between the plurality of batteries.

The controller may include: the temperature detecting unit measuring the temperature of the space in which the plurality of batteries are positioned; a first comparing unit comparing, with a preset setting temperature value, the temperature value measured by the temperature detecting unit; and a control unit controlling operations of the first switch, the second switch, and the plurality of auxiliary switches, depending on a comparison result of the first comparing unit.

The controller may further include: a voltage measuring unit measuring a voltage of the plurality of batteries; and a second comparing unit comparing, with a preset setting voltage value, a voltage value measured by the voltage measuring unit, wherein the control unit controls operations of the first switch, the second switch, and the plurality of auxiliary switches, depending on a comparison result of the second comparing unit.

A method for controlling the temperature of a battery includes: providing a plurality of batteries connected to a power generation line connected to an external generator; measuring the temperature of a space in which the plurality of batteries are positioned; and controlling charging and discharging between the plurality of batteries according to the measured temperature so as to raise the temperature of the plurality of batteries.

The controlling of charging and discharging between the plurality of batteries may include: blocking a connection between the plurality of batteries and the power generation line; and forming a charging and discharging path between the plurality of batteries so as to allow the plurality of batteries to generate heat.

The controlling of charging and discharging between the plurality of batteries may further include: connecting the plurality of batteries and a hot-air blower installed to supply hot air to the space in which the plurality of batteries are positioned; and supplying, to the hot-air blower, at least a portion of current discharged from the plurality of batteries.

The supplying of at least a portion of current discharged from the plurality of batteries to the hot-air blower may include: discharging at least a portion of the plurality of batteries so as to supply current to the hot-air blower; and allowing the at least a portion of the plurality of batteries discharged to generate heat.

The controlling of charging and discharging between the plurality of batteries may include: stopping supply of current to the hot-air blower; supplying current of another battery to a discharged battery of the plurality of batteries; and allowing a charged battery and the discharged battery of the plurality of batteries to generate heat.

The controlling of charging and discharging between the plurality of batteries may further include: measuring a voltage of the plurality of batteries; comparing a measured voltage value with a preset voltage value; and blocking a connection between the plurality of batteries and the hot-air blower when the measured voltage value is less than the preset voltage value.

The method may further include comparing the measured voltage value with the preset voltage value and then connecting the plurality of batteries with the power generation line when the measured voltage value is less than the preset voltage value, so as to charge the plurality of batteries.

The measuring of the temperature of a space in which the plurality of batteries are positioned may include comparing a measured temperature value with a preset setting temperature value, and the raising of the temperature of the plurality of batteries according to the measured temperature may include raising the temperature of the plurality of batteries when the measured temperature value is less than or equal to the preset setting temperature value.

Advantageous Effects

In accordance with an exemplary embodiment, when a battery is exposed to a low-temperature environment, the temperature of the battery can be easily raised. Thus, a problem that low temperatures cause output of the battery to be reduced can be prevented.

In addition, energy used for raising the temperature of the battery can be used efficiently. Thus, energy can be prevented from being wasted, and the temperature of the battery can be raised using less energy. As a result, use efficiency of energy can be improved.

MODE FOR CARRYING OUT THE INVENTION

Hereinafter, embodiments of the present invention will be described in more detail with reference to the attached drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The drawings may be exaggerated to explain the invention in detail, wherein like reference numerals refer to like elements throughout.

Figure 1:
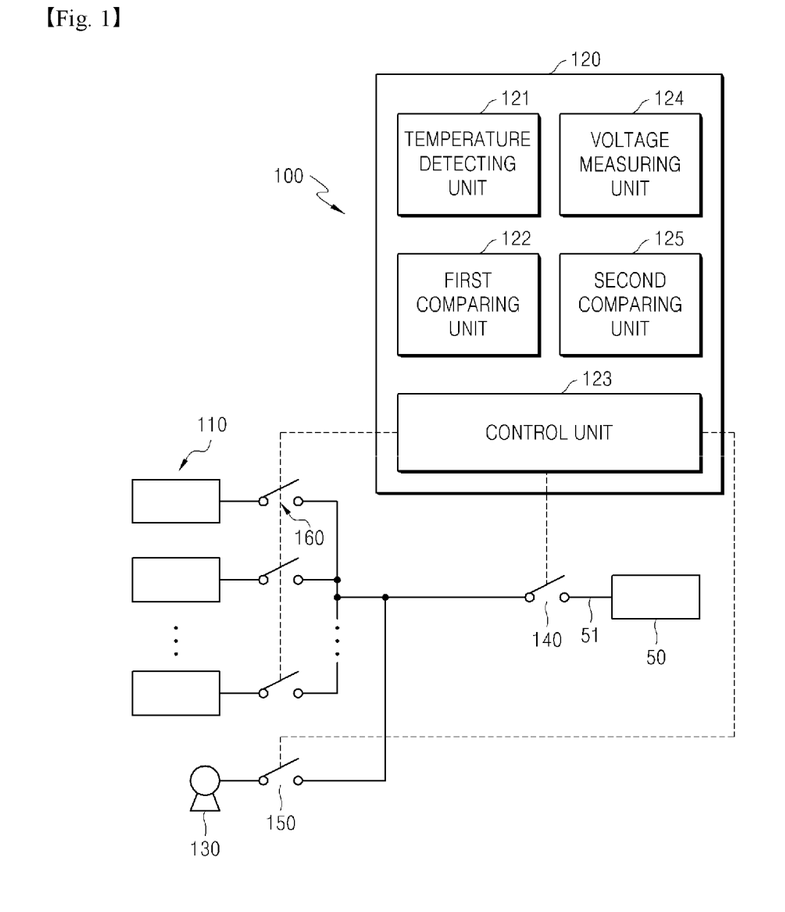
FIG. 1 is a view showing a structure of a battery device in accordance with an exemplary embodiment.

FIG. 1 is a view showing a structure of a battery device in accordance with an exemplary embodiment.

Referring to FIG. 1, a battery device 100 in accordance with an exemplary embodiment includes a battery 110 connected to a power generation line 51, and a controller 120. In addition, the battery device 100 may further include a hot-air blower 130, a first switch 140, a second switch 150, a third switch (not illustrated), and a plurality of auxiliary switches.

A generator 50 supplies power to the battery 110 or receives power supplied from the battery 110. Accordingly, when a voltage of the battery 110 is insufficient, power may be supplied from the power generation line 51 to the battery 110 to charge the battery 110. When the voltage of the battery 110 is sufficient, the battery 110 may transmit power to the power generation line 51. At this time, instead of the generator 50, a substation and a transmission line may be provided.

The power generation line 51 serves to electrically connect the generator 50 to the battery 110. Hence, power of the generator 50 may be transmitted to the battery 110 through the power generation line 51.

The battery 110 is electrically connected to the power generation line 51. The battery 110 may store the power supplied from the power generation line 51. For example, the battery 110 may be a lithium ion battery.

In addition, the battery 110 may be provided in a plurality. A plurality of batteries 110 may be connected in parallel to be electrically connected to each other. Accordingly, current stored in one battery 110 may flow to another battery 110. Thus, while the current flows between the batteries 110, the batteries 110 may be charged or discharged. At this time, final terminals of the batteries 110 connected in parallel are connected to the power generation line 51.

The first switch 140 is installed on the power generation line 51 (or between the battery 110 and the generator 50). Accordingly, the first switch 140 may block an electrical connection between the generator 50 and the battery 110 or electrically connect the generator 50 to the battery 110. That is, the first switch 140 may be turned on or off between the power generation line 51 and the battery 110. Thus, an operation of the first switch 140 may be controlled so that supply of power from the power generation line 51 to the battery 110 or transmission of power from the battery 110 to the power generation line 51 is stopped.

An auxiliary switch 160 serves to control a flow of current between the plurality of batteries 110. The auxiliary switch 160 may be provided in a plurality and installed between the plurality of batteries 110. The auxiliary switches 160 may be provided as many as the number of batteries 110 provided. Hence, an operation of the auxiliary switch 160 may be controlled so that current flows between the batteries 110 connected in parallel.

In addition, the plurality of auxiliary switches 160 may be connected to a line connected to the first switch 140. Accordingly, operations of the plurality of auxiliary switches 160 may be controlled so that power of the power generation line 51 is supplied to only a desired battery 110 or power of only the desired battery 110 is transmitted to the power generation line 51.

The hot-air blower 130 serves to supply hot air to a space in which the battery 110 is positioned. The hot-air blower 130 is electrically connected to the battery 110. At this time, the final terminals of the batteries 110 connected in parallel may be connected to the hot-air blower 130. That is, the final terminals of the batteries 110 connected in parallel may be connected in parallel to the power generation line 51 and the hot-air blower 130. Thus, the hot-air blower 130 may be operated by the power supplied from the battery 110 so as to generate hot air and raise the temperature of the battery 110.

In addition, the hot-air blower 130 may include a heating element and a fan. The heating element serves to generate heat, and the fan may be installed on a rear side of the heating element to push air toward the battery 110 in front thereof. Hence, when the fan operates in a state in which the heating element generates heat, warm wind may be forced to send to the space in which the battery 110 is stored.

The second switch 150 is installed between the hot-air blower 130 and the batteries 110. Accordingly, the second switch 150 may block an electrical connection between the hot-air blower 130 and the battery 110 or electrically connect the hot-air blower 130 to the battery 110. That is, the second switch 150 may be turned on or off between the hot-air blower 130 and the battery 110. Thus, an operation of the second switch 150 may be controlled so that, while power is transmitted or not from the battery 110 to the hot-air blower 130, the hot-air blower 130 may be operated or not.

At this time, the battery 110 and the power generation line 51 may be electrically connected to a power consumption device (not illustrated). Thus, the power stored in the battery 110 or the power supplied from the power generation line 51 may be supplied to the power consumption device, which may be operated by the supplied power.

The third switch is installed between the power consumption device and the battery 110. In addition, the third switch is installed between the power consumption device and the power generation line 51. Accordingly, the third switch may make or block an electrical connection between the power consumption device and the battery 110 and between the power consumption device and the power generation line 51. Thus, an operation of the third switch may be controlled so that power is supplied to the power consumption device or supply of power thereto is stopped.

The controller 120 may control charging and discharging between the batteries 110 according to the temperature of the space in which the batteries 110 are positioned. Hence, the temperature of the batteries 110 may be raised using heat generated by charging and discharging between the batteries 110.

In addition, the controller 120 may control discharging of the battery 110 such that at least a portion of current discharged from the battery 110 is supplied to the hot-air blower 130. Accordingly, the controller 120 operates the hot-air blower 130 while the battery 110 generates heat by discharging the battery 110, so as to supply hot air to the space in which the battery 110 is positioned. Thus, the battery 110 not only generates heat, but also the space in which the battery 110 is stored is heated, so that the temperature of the battery 110 may be raised rapidly.

The controller 120 includes a temperature detecting unit 121, a first comparing unit 122, and a control unit 123. In addition, the control unit 123 may further include a voltage measuring unit 124 and a second comparing unit 125.

The temperature detecting unit 121 may measure the temperature of the space in which the battery 110 is positioned. For example, the temperature detecting unit 121 may be a temperature measuring sensor and may be installed in the space in which the battery 110 is positioned. Hence, the temperature of the space in which the battery 110 is positioned may be monitored using the temperature detecting unit 121.

The first comparing unit 122 is connected to the temperature detecting unit 121. The first comparing unit 122 may compare, with a preset setting temperature value, a temperature value measured by the temperature detecting unit 121. Any one among values between −20 to 0° C. may be selected as the setting temperature value. Accordingly, because the temperature of the space in which the battery 110 is positioned is room temperature when the measured temperature value is greater than the setting temperature value, it may be determined that the battery 110 may operate normally. Thus, it may be determined that it is not required to raise the temperature of the battery 110.

In contrast, because the temperature of the space in which the battery 110 is positioned is a low temperature when the measured temperature value is less than or equal to the setting temperature value, it may be determined that output of the battery 110 may be reduced. Thus, it may be determined that an operation of raising the temperature of the battery 110 or the space in which the battery 110 is positioned needs to be performed.

The control unit 123 is connected to the first comparing unit 122. Hence, the control unit 123 may control charging and discharging between the batteries 110 and supply of current to the hot-air blower 130, depending on a comparison result of the first comparing unit 122. That is, the control unit 123 may control operations of the first switch 140, the second switch 150, the third switch, and the plurality of auxiliary switches 160.

For example, when it is determined that the temperature of the space in which the battery 110 is positioned is a low temperature, the control unit 123 turns off the first switch 140 and the third switch. That is, an electrical connection between the battery 110 and the power generation line 51 may be blocked, and an electrical connection between the battery 110 and the power consumption device may be blocked. The second switch 150 may be turned on to electrically connect the battery 110 to the hot-air blower 130.

Then, the control unit 123 may turn on at least a portion of the plurality of auxiliary switches 160 and turn off another portion thereof. In such a state, when the control unit 123 turns on the second switch 150, one of the plurality of batteries 110, for which the auxiliary switch 160 is turned on, may discharge current to the hot-air blower 130. Accordingly, the discharged battery may generate heat, and the hot-air blower 130 may be operated to supply hot air to the space in which the battery 110 is stored. Thus, the temperature of the space in which the battery 110 is stored may be raised rapidly.

Then, when the battery 110, for which the auxiliary switch 160 is turned on, is completely discharged, the control unit 123 may turn off the second switch 150. That is, an electrical connection between the battery 110 and the hot-air blower 130 may be blocked. Hence, the operation of the hot-air blower 130 may be stopped.

Then, the control unit 123 may control an operation of the auxiliary switch 160 to electrically connect the discharged battery 110 to a non-discharged battery 110. Accordingly, current may be supplied from the non-discharged battery 110 to the discharged battery 110. The non-discharged battery 110 is discharged, and while the discharged battery 110 is charged, the batteries 110 may generate heat. Thus, the battery 110 may be maintained at room temperature.

When the temperature of the space in which the battery 110 is stored rises to room temperature, an operation of charging or discharging the batteries 110 may be stopped. Then, the control unit 123 may turn on the first switch 140 or the third switch. That is, the battery 110 and the power generation line 51 may be electrically connected, or the battery 110 and the power consumption device may be electrically connected.

The voltage measuring unit 124 may measure a voltage of the battery 110. For example, the voltage measuring unit 124 may be a detector capable of detecting the voltage of the battery 110. A single voltage measuring unit 124 may be provided to measure a total voltage of the plurality of batteries 110. Alternatively, the voltage measuring unit 124 may be provided in a plurality to measure a voltage of each battery 110, calculate an average of measured values, measure a total voltage of the plurality of batteries 110. Hence, an overall voltage state of the battery 110 may be monitored using the voltage measuring unit 124.

The second comparing unit 125 is connected to the voltage measuring unit 124. The second comparing unit 125 may compare, with a preset setting voltage value, a voltage value measured by the voltage measuring unit 124. Based on 100% voltage of a completely charged battery 110, any one of values of 40 to 60% voltage may be selected as the setting voltage value. Accordingly, when the measured voltage value is greater than the setting voltage value, it may be determined that the battery 110 is free from risk of being completely discharged. Thus, it may be determined that it is not required to stop an operation of raising the temperature of the battery 110.

In contrast, when the measured voltage value is less than or equal to the setting voltage value, it may be determined that the battery 110 involves risk of being completely discharged. Thus, it may be determined that the battery 110 needs to be prevented from being discharged by stopping the operation of raising the temperature of the battery 110.

At this time, the control unit 123 is connected to the second comparing unit 125. Hence, the control unit 123 may control charging and discharging between the batteries 110 and supply of current to the hot-air blower 130, depending on a comparison result of the second comparing unit 125. That is, the control unit 123 may control operations of the first switch 140, the second switch 150, the third switch, and the plurality of auxiliary switches 160.

For example, when it is determined that an entirety of the batteries 110 involves risk of being discharged, the control unit 123 may turn off the second switch 150 and the third switch. That is, an electrical connection between the battery 110 and the power consumption device may be blocked, and an electrical connection between the battery 110 and the hot-air blower 130 may be blocked.

Then, the control unit 123 may turn on the first switch 140 in a state of turning on all of the auxiliary switches 160. That is, in a state in which all of the batteries 110 are connected electrically, the batteries 110 and the power generation line 51 may be electrically connected. Accordingly, the power generation line 51 supplies power to the batteries 110 so that the batteries 110 may be charged.

Meanwhile, the control unit 123 turns off only the third switch in a state of turning on all of the first switch 140, the second switch 150, and the auxiliary switch 160 when it is determined that the entirety of the batteries 110 involves risk of being discharged while the temperature of the space in which the battery 110 is positioned is determined as a low temperature. Hence, the power supplied from the power generation line 51 operates the hot-air blower 130 while charging the battery 110, so as to supply hot air to the space in which the battery 110 is positioned.

Likewise, when the battery 110 is exposed to a low-temperature environment, the temperature of the battery 110 may be raised automatically and easily. Thus, a problem that low temperatures cause output of the battery 110 to be reduced may be prevented. In addition, energy used for raising the temperature of the battery 110 may be used efficiently. Accordingly, energy may be prevented from being wasted, and the temperature of the battery may be raised using less energy. Thus, use efficiency of energy may be improved.

Figure 2:
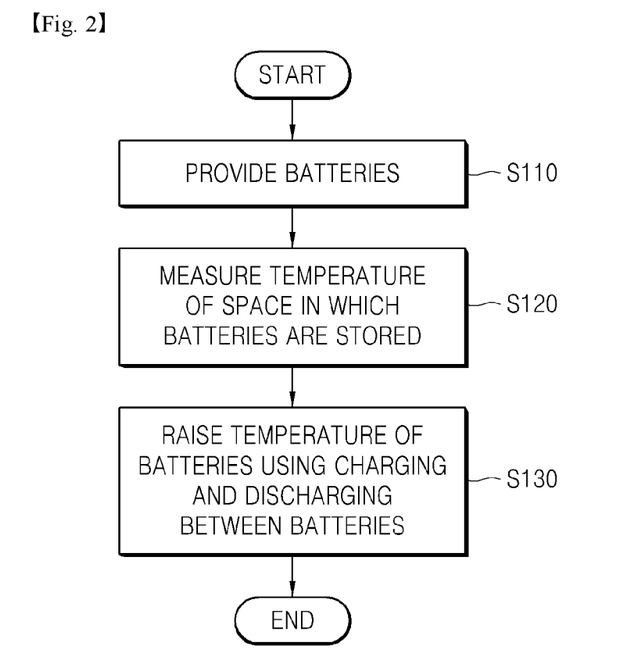
FIG. 2 is a flowchart illustrating a method for controlling the temperature of a battery in accordance with an exemplary embodiment.
Figure 3:
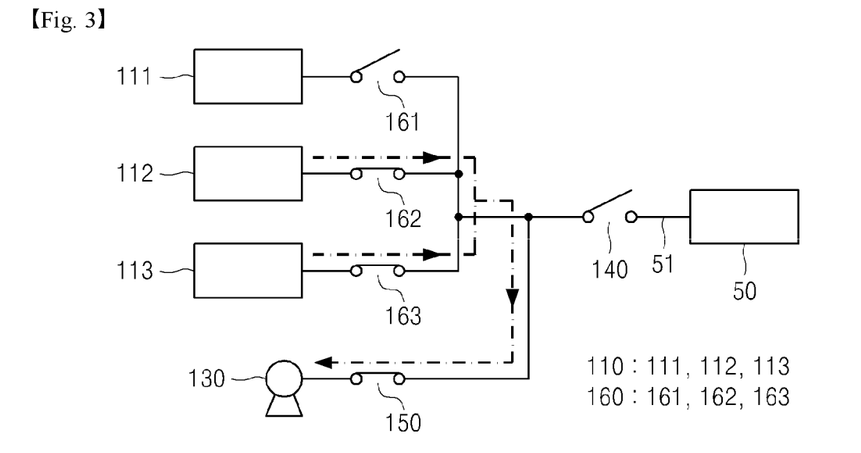
FIG. 3 is a view showing a structure for supplying current from the battery to a hot-air blower in accordance with an exemplary embodiment.
Figure 4:
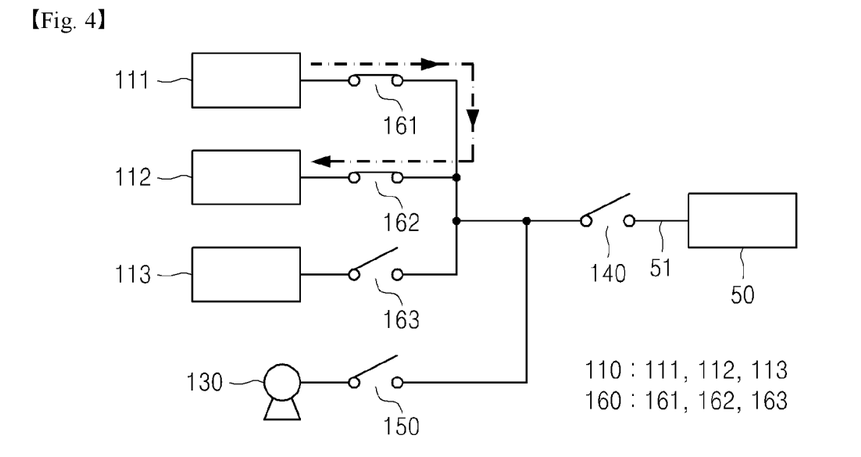
FIG. 4 is a view showing a structure for supplying current from one battery to another battery in accordance with an exemplary embodiment.
Figure 5:
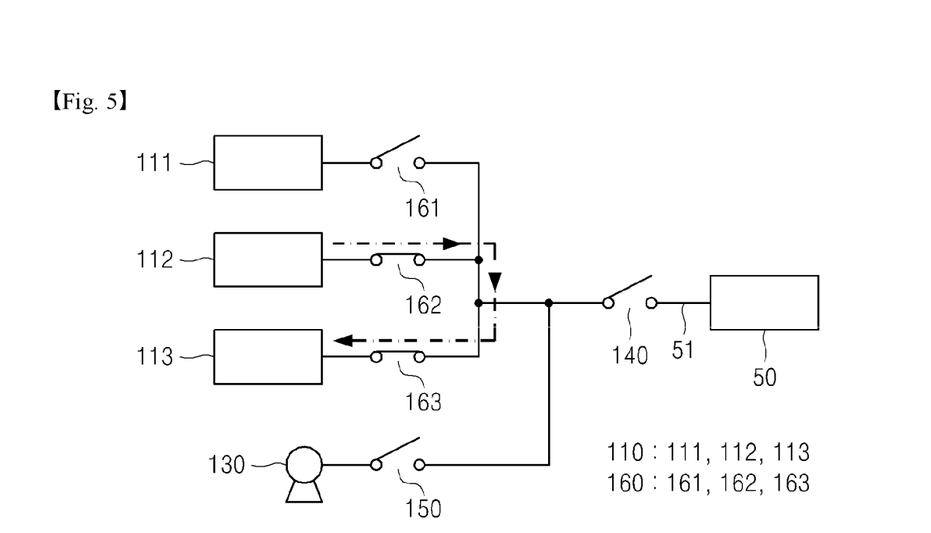
FIG. 5 is a view showing a structure for supplying current from another battery to another battery in accordance with an exemplary embodiment.
Figure 6:
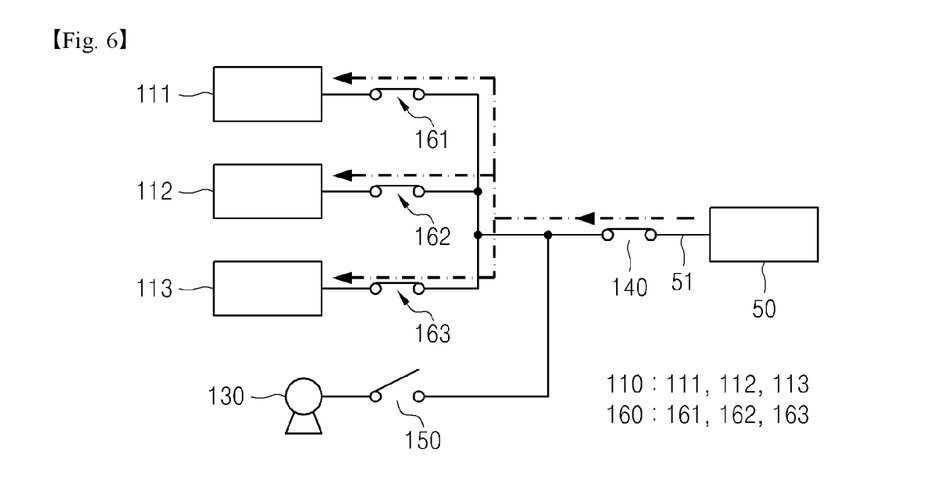
FIG. 6 is a view showing a structure for charging the battery in accordance with an exemplary embodiment.

FIG. 2 is a flowchart illustrating a method for controlling the temperature of a battery in accordance with an exemplary embodiment. FIG. 3 is a view showing a structure for supplying current from the battery to a hot-air blower in accordance with an exemplary embodiment. FIG. 4 is a view showing a structure for supplying current from one battery to another battery in accordance with an exemplary embodiment. FIG. 5 is a view showing a structure for supplying current from another battery to another battery in accordance with an exemplary embodiment. FIG. 6 is a view showing a structure for charging the battery in accordance with an exemplary embodiment. Hereinafter, the method for controlling the temperature of a battery in accordance with the exemplary embodiment will be described.

Referring to FIG. 2, the method for controlling the temperature of a battery in accordance with an exemplary embodiment includes providing a plurality of batteries connected to a power generation line connected to a generator (S110), measuring the temperature of a space in which the plurality of batteries are positioned (S120); and controlling charging and discharging between the plurality of batteries according to the measured temperature so as to raise the temperature of the batteries (S130).

At this time, the temperature of the battery may be controlled during a rest period. That is, since the battery does not generate heat by not being charged or discharged, the battery may easily fall into a low-temperature state during the rest period. Thus, an operation of raising the temperature of the battery according to the temperature of the space in which the battery is positioned may be performed during the rest period.

In addition, the embodiment of the present invention will be described by exemplifying a case in which the battery includes a first battery, a second battery, and a third battery and an auxiliary switch includes a first auxiliary switch, a second auxiliary switch, and a third auxiliary switch. However, the number of the battery and the auxiliary switch is not limited thereto and may vary.

Using a temperature detecting unit, the temperature of the space in which the battery is positioned may be monitored in real time. A temperature value measured by the temperature detecting unit may be compared with a preset setting temperature value. Any one among values between −20 to 0° C. may be selected as the setting temperature value. Accordingly, because the temperature of the space in which the battery is positioned is room temperature when the measured temperature value is greater than the setting temperature value, it may be determined that the battery may operate normally. Thus, it may be determined that it is not required to raise the temperature of the battery.

In contrast, because the temperature of the space in which the battery is positioned is a low temperature when the measured temperature value is less than or equal to the setting temperature value, it may be determined that output of the battery may be reduced. Thus, it may be determined that an operation of raising the temperature of the battery or the space in which the battery is positioned needs to be performed.

When it is determined that the temperature of the space in which the battery is positioned is a low temperature, the first switch 140 and the third switch may be turned off as illustrated in FIG. 3. That is, an electrical connection between the batteries 110 and the power generation line 51 may be blocked, and an electrical connection between the batteries 110 and the power consumption device may be blocked. The second switch 150 may be turned on to electrically connect the battery 110 to the hot-air blower 130 installed to supply hot air to the space in which the battery 110 is positioned.

At this time, a first auxiliary switch 161 may be turned off, and a second auxiliary switch 162 and a third auxiliary switch 163 may be turned on. Thus, only a second battery 112 and a third battery 113 are electrically connected to the hot-air blower 130, and a first battery 111 and the hot-air blower 130 are not electrically connected. Accordingly, current discharged from the second battery 112 and the third battery 113 may be supplied to the hot-air blower 130 to operate the hot-air blower 130.

The second battery 112 and the third battery 113 may generate heat while being discharged, and the hot-air blower 130 may be operated to supply hot air to the space in which the battery 110 is stored. Thus, the space in which the battery 110 is stored may be doubly heated so that the temperature thereof may be raised rapidly. Hence, efficient use of power from the second battery 112 and the third battery 113 may allow the temperature thereof to be raised.

Then, when the second battery 112 and the third battery 113 are discharged, the second switch 150 may be turned off as illustrated in FIG. 4. That is, an electrical connection between the battery 110 and the hot-air blower 130 may be blocked. Accordingly, supply of current to the hot-air blower 130 may be stopped so that the operation of the hot-air blower 130 is stopped.

Then, a charging and discharging path may be formed between the batteries 110 such that current is passed between the batteries 110 to charge or discharge the batteries 110. That is, current of another battery 110 not discharged may be passed to a discharged battery 110 of the plurality of batteries 110. Hence, a battery being charged and a battery 110 being discharged generate heat so that the temperature of the space in which the battery 110 is positioned may be raised.

For example, the third auxiliary switch 163 may be turned off in a state in which the first auxiliary switch 161 and the second auxiliary switch 162 are turned on. Accordingly, the first battery 111 and the second battery 112 may be electrically connected, and the third battery 113 may not be electrically connected to the first battery 111 and the second battery 112.

Since an internal voltage of the first battery 111 not discharged is higher than that of the second battery 112 discharged, current flows from the first battery 111 to the second battery 112. Hence, while the first battery 111 is discharged and the second battery 112 is charged, the first battery 111 and the second battery 112 may generate heat. When the voltages of the first battery 111 and the second battery 112 are equalized, the current supply may be stopped.

Then, the third switch may be turned on in a state in which the first auxiliary switch 161 is turned off as illustrated in FIG. 5. Accordingly, the second battery 112 and the third battery 113 may be electrically connected, and the first battery 111 may not be electrically connected to the second battery 112 and the third battery 113.

Since an internal voltage of the second battery 112 discharged by the first battery 111 is higher than that of the third battery 113 discharged, current flows from the second battery 112 to the third battery 113. Hence, while the second battery 112 is discharged and the third battery 113 is charged, the second battery 112 and the third battery 113 may generate heat. When the voltages of the second battery 112 and the third battery 113 are equalized, the current supply may be stopped.

Since the voltage of the second battery 112 and the voltage of the first battery 111 are lowered, an electrical connection between the second battery 112 and the third battery 113 may be blocked, and the first battery 111 and the second battery 112 may be electrically reconnected. Accordingly, while current flows from the first battery 111 to the second battery 112, the first battery 111 is charged and the second battery 112 is discharged. Thus, the first battery 111 and the second battery 112 may generate heat.

Thereafter, such charging and discharging may be repeated so that the batteries 110 generate heat. Thus, the temperature raised using the hot-air blower 130 may be maintained with heat generated by charging and discharging between the batteries 110. Hence, the space in which the battery 110 is positioned may be maintained at room temperature. When the temperature of the space in which the battery 110 is stored rises to, or is maintained as, a certain temperature, an operation of charging or discharging the batteries 110 may be stopped.

Meanwhile, when an operation of raising the temperature of the battery 110 is performed, the voltage measuring unit may measure the voltage of the batteries 110 and monitor the measured voltage in real time. A voltage value measured by the voltage measuring unit may be compared with a preset setting voltage value. Based on 100% voltage of a completely charged battery 110, any one of values of 40 to 60% voltage may be selected as the setting voltage value. Accordingly, when the measured voltage value is greater than the setting voltage value, it may be determined that the battery 110 is free from risk of being completely discharged. Thus, it may be determined that it is not required to stop the operation of raising the temperature of the battery 110.

In contrast, when the measured voltage value is less than or equal to the setting voltage value, it may be determined that the battery 110 involves risk of being completely discharged. Thus, it may be determined that the battery 110 needs to be prevented from being discharged by stopping the operation of raising the temperature of the battery 110.

When the measured voltage value is less than or equal to the setting voltage value upon operating of the hot-air blower 130, the second switch 150 may be turned off. That is, an electrical connection between the battery 110 and the hot-air blower 130 may be blocked. Hence, current may not be discharged from the battery 110 to the hot-air blower 130, and the voltage of the battery 110 may be prevented from being lowered.

Then, the first switch 140 may be turned on in a state of closing all of the auxiliary switches 160. That is, the batteries 110 and the power generation line 51 may be electrically connected. Accordingly, power is supplied from the power generation line 51 to the batteries 110 so that the batteries 110 may be charged before being all discharged. At this time, the third switch is in a turn off state.

In addition, only the third switch may be turned off in a state of closing all of the first switch 140, the second switch 150, and the auxiliary switch 160 when it is determined that the entirety of the batteries 110 involves risk of being discharged while the temperature of the space in which the battery 110 is positioned is determined as a low temperature. Hence, the power supplied from the power generation line 51 operates the hot-air blower 130 while charging the battery 110, so as to supply hot air to the space in which the battery 110 is positioned. Thus, charging of the battery 110 and the operation of raising the temperature of the space in which the battery 110 is positioned may be performed simultaneously.

Likewise, when the battery 110 is exposed to a low-temperature environment, the temperature of the battery 110 may be raised automatically and easily. Hence, a problem that low temperatures cause output of the battery 110 to be reduced may be prevented. In addition, energy used for raising the temperature of the battery 110 may be used efficiently. Accordingly, energy may be prevented from being wasted, and the temperature of the battery may be raised using less energy. Thus, use efficiency of energy may be improved.

Although the battery device and the method for controlling the temperature of a battery have been described with reference to the specific embodiments, various modifications and changes can be made thereto without departing from the scope of the present invention. Therefore, the scope of the present invention is not limited to the embodiments described above and should be defined by the accompanying claims and the equivalents of the claims.

What is claimed is:

1. A battery device, comprising:
   a power generation line connected to an external generator;
   a plurality of batteries configured to be connected to the power generation line to receive and be charged by power from the external generator via the power generation line based on a voltage of the plurality of batteries;
   a hot-air blower configured to supply hot air to a space in which the plurality of batteries are positioned;
   a controller configured to control charging and discharging between the plurality of batteries according to a temperature of the space in which the plurality of batteries are positioned to raise the temperature of the plurality of batteries;
   a first switch installed on the power generation line to connect the plurality of batteries to the external generator or to disconnect the plurality of batteries from the external generator based on the voltage of the plurality of batteries and on the temperature of the space in which the plurality of batteries are positioned; and
   a second switch installed between the hot-air blower and the plurality of batteries to connect the hot-air blower to at least one of the plurality of batteries or to disconnect the hot-air blower from the plurality of batteries based on the voltage of the plurality of batteries and on the temperature of the space in which the plurality of batteries are positioned,
   wherein the plurality of batteries are connected in parallel, and final terminals of the plurality of batteries connected in parallel are configured to be connected in parallel to the power generation line and the hot-air blower.

2. The battery device of claim 1, wherein the controller is configured to control discharging of the plurality of batteries so as to supply, to the hot-air blower, at least a portion of current discharged from the plurality of batteries.

3. The battery device of claim 1, further comprising a plurality of auxiliary switches installed between the plurality of batteries so as to control a flow of the current between the plurality of batteries.

4. The battery device of claim 3, wherein the controller comprises:
   a temperature detecting unit configure to measure the temperature of the space in which the plurality of batteries are positioned;
   a first comparing unit configured to compare, with a preset setting temperature value, the temperature value measured by the temperature detecting unit; and
   a control unit configured to control operations of the first switch, the second switch, and the plurality of auxiliary switches, depending on a comparison result of the first comparing unit.

5. The battery device of claim 4, wherein the controller further comprises:
   a voltage measuring unit configured to measure the voltage of the plurality of batteries; and
   a second comparing unit configured to compare, with a preset setting voltage value, a voltage value measured by the voltage measuring unit,
   wherein the control unit is further configured to control operations of the first switch, the second switch, and the plurality of auxiliary switches, depending on a comparison result of the second comparing unit.

6. The battery device of claim 1, wherein the plurality of batteries are further configured to transmit power to the power generation line based on the voltage of the plurality of batteries.

7. The battery device of claim 1, wherein the controller is further configured to control the first switch to connect or disconnect the plurality of batteries to or from the power generation line connected to the external power based on the voltage of the plurality of batteries and on the temperature of the space in which the plurality of batteries are positioned.

8. A method for controlling a temperature of a battery, the method comprising:
   providing a plurality of batteries configured to be connected to a power generation line connected to an external generator to receive and be charged by power from the external generator via the power generation line based on a voltage of the plurality of batteries;
   measuring a temperature of a space in which the plurality of batteries are positioned; and
   controlling charging and discharging of the plurality of batteries according to the measured temperature and the voltage of the plurality of batteries,
   wherein the controlling of charging and discharging includes:
      controlling a first switch installed on the power generation line to connect the plurality of batteries to the external generator or to disconnect the plurality of batteries from the external generator based on the voltage of the plurality of batteries and on the temperature of the space in which the plurality of batteries are positioned; and
      controlling a second switch installed between the hot-air blower and the plurality of batteries to connect a hot-air blower in parallel to the power generation line and at least one of the plurality of batteries to supply hot air to the space in which the plurality of batteries are positioned or to disconnect the hot-air blower from the plurality of batteries, based on the voltage of the plurality of batteries and on the temperature of the space in which the plurality of batteries are positioned.

9. The method of claim 8, wherein the controlling of charging and discharging further comprises:
blocking a connection between the plurality of batteries and the power generation line based on the measured temperature; and
forming a charging and discharging path between the plurality of batteries so as to allow the plurality of batteries to generate heat.

10. The method of claim 9, wherein the controlling of charging and discharging further comprises:
supplying, to the hot-air blower, at least a portion of current discharged from the plurality of batteries.

11. The method of claim 10, wherein the supplying of at least a portion of current discharged from the plurality of batteries to the hot-air blower comprises:
discharging at least a portion of the plurality of batteries so as to supply current to the hot-air blower; and
allowing the at least a portion of the plurality of batteries discharged to generate heat.

12. The method of claim 11, wherein the controlling of charging and discharging further comprises:
stopping supply of current to the hot-air blower;
supplying current of another battery to a discharged battery of the plurality of batteries; and
allowing a charged battery and the discharged battery of the plurality of batteries to generate heat.

13. The method of claim 10, wherein the controlling of charging and discharging further comprises:
measuring the voltage of the plurality of batteries;
comparing a measured voltage value with a preset voltage value; and
blocking a connection between the plurality of batteries and the hot-air blower if the measured voltage value is less than the preset voltage value.

14. The method of claim 13, further comprising comparing the measured voltage value with the preset voltage value,
wherein the controlling of the charging and discharging further comprises connecting the plurality of batteries with the power generation line if the measured voltage value is less than the preset voltage value, so as to charge the plurality of batteries via the power generation line.

15. The method of claim 8, further comprising comparing a measured temperature value with a preset setting temperature value,
wherein the controlling of charging and discharging further comprises raising the temperature of the plurality of batteries if the measured temperature value is less than or equal to the preset setting temperature value.

16. The method of claim 8, wherein the plurality of batteries are further configured to transmit power to the power generation line based on the voltage of the plurality of batteries.

* * * * *